United States Patent
Hayashi et al.

(10) Patent No.: US 6,893,725 B2
(45) Date of Patent: May 17, 2005

(54) IN-GLAZE DECORATION RAISED DECORATED CERAMIC ARTICLES AND TRANSCRIPTION SHEET

(75) Inventors: Hiromichi Hayashi, Aichi (JP); Takuya Kawamura, Aichi (JP)

(73) Assignee: Noritake Co., Limited, Nagoya (JP)

( * ) Notice: Subject to any disclaimer, the term of this patent is extended or adjusted under 35 U.S.C. 154(b) by 210 days.

(21) Appl. No.: 09/892,895

(22) Filed: Jun. 28, 2001

(65) Prior Publication Data

US 2002/0022133 A1 Feb. 21, 2002

(30) Foreign Application Priority Data

Jun. 29, 2000 (JP) .................................. 2000-196699

(51) Int. Cl.[7] .............................................. B32B 15/00
(52) U.S. Cl. ....................... 428/432; 428/13; 428/34; 428/201; 428/334; 428/699; 427/193; 427/475
(58) Field of Search ............................ 427/193, 475; 428/34, 334, 13, 201, 432, 699

(56) References Cited

U.S. PATENT DOCUMENTS

| | | | |
|---|---|---|---|
| 2,970,076 A | | 1/1961 | Porth |
| 3,533,822 A | | 10/1970 | Bailey ..................... 117/3.4 |
| 3,791,841 A | | 2/1974 | Carmellini et al. ......... 117/3.4 |
| 3,956,558 A | * | 5/1976 | Blanco et al. ............ 427/190 |
| 4,892,847 A | * | 1/1990 | Reinherz ................... 501/14 |
| 5,262,363 A | * | 11/1993 | Yoshida et al. ............. 501/17 |
| 5,342,810 A | * | 8/1994 | Merigaud et al. ........... 501/26 |
| 5,370,913 A | * | 12/1994 | Lin .......................... 428/13 |
| 5,389,402 A | * | 2/1995 | Speer et al. .............. 427/258 |
| 5,747,153 A | * | 5/1998 | McDaniel ................. 427/279 |
| 5,966,571 A | * | 10/1999 | Tavernier et al. ......... 430/126 |
| 6,127,005 A | * | 10/2000 | Lehman et al. ........... 427/553 |

FOREIGN PATENT DOCUMENTS

| | | |
|---|---|---|
| JP | 57-123876 | 8/1982 |
| JP | 58-25983 | 2/1983 |
| JP | 5-301496 | 11/1993 |

* cited by examiner

Primary Examiner—Cynthia H. Kelly
Assistant Examiner—Tamra L. Dicus
(74) Attorney, Agent, or Firm—Armstrong, Kratz, Quintos, Hanson & Brooks, LLP (57) ABSTRACT

To provide a decorative porcelain having a superior stereoscopic feeling and a transcription sheet.

An in-glaze decoration piled decorative porcelain having a piled coloring material layer obtained on in-glaze painting on a glazing layer formed on a surface of a porcelain substrate layer, using a pile coloring material including an inorganic pigment and a glass flux. The in-glaze decoration piled decorative porcelain includes a glass layer of glass with a glass transition temperature of 450° C. to 550° C. between the glazing layer and the piled coloring material layer, with the glass transition temperature of glass flux in the piled coloring material being 550° C. to 700° C.

36 Claims, 6 Drawing Sheets

IN-GLAZE DECORATION RAISED DECORATED CERAMIC ARTICLES AND TRANSCRIPTION SHEET

FIELD OF THE INVENTION

This invention relates to ceramic articles such as porcelain decorated with inorganic pigments and to a transcription sheet used therefor. More particularly, it relates to a decorated porcelain with raised patterns employing an in-glaze decoration technique rich in stereoscopic appearance and color and superior in durabilities of various sorts, and to a transcription sheet used therefor.

Definition: In the present invention the term "ceramic article(s)" generally includes pottery, ceramic whiteware, porcelains, earthen ware, or other ceramic products produced by sintering inorganic materials, particularly oxides and/or minerals such as clays etc.

BACKGROUND

When seen in the cross-section, the ceramic decorated with inorganic pigments (inorganic coloring material) is routinely constructed by a substrate (body or ground) layer, a glazing layer and a coloring material layer. The coloring material layer, also termed a decorative part, is formed by coating a European style coloring material or a Japanese style coloring material over a glazing layer applied to a pale to white-colored substrate layer followed by firing, baking to be affixed in situ. The European style coloring material is a mixture of inorganic pigments manifesting a variety of color tones and a colorless transparent glass as a binder, whilst a Japanese style coloring material is comprised of colored glass powders obtained on smelting pigments in a colorless transparent glass.

Based on the relative positions of the glazing layer and the coloring material layer, the coloring decorative method for decorative porcelain may be roughly classified into an under-glazing coloring method, applying a substrate layer, a coloring material layer and a glazing layer, in this order, an in-glaze coloring method, applying a substrate layer, a coloring material layer partially or wholly precipitated into a glazing layer and a glazing layer, in this order, and an on-glaze coloring method, applying a substrate layer, a glazing layer and a coloring material layer, again in this order. Each of these three methods has its peculiar characteristics. Of these, the in-glaze coloring method is compromised between the other two methods as to the firing temperature and the structure. Moreover, with the in-glaze coloring method, a larger number of inorganic pigments can be used than with the under-glazing coloring method so that the color or the pattern may be expressed more profusely. In addition, with the in-glaze coloring method, since the firing temperature is higher than with the on-glaze (over-glaze) coloring method, the inorganic coloring material may be precipitated into the glazing layer, so that the chemical durability is higher even if the ceramic article is washed with acid or with alkali. Moreover, there is little risk of the coloring material layer being peeled off or detached despite wear or friction during mechanical handling such as during rinsing of various sorts.

In these years, the in-glaze coloring method has come to be used more frequently than the other methods. In particular, a hard ceramic ware (china ware) obtained on prompt firing with the use of the so-called RHK (roller hearth kiln) is now in widespread use. In this case, the firing temperature, that is the temperature of affixing the decoration, is close to the glost firing or biscuit firing temperature of the substrate layer, whilst the time required for firing is drastically reduced as compared to that in case of the conventional tunnel kiln, such that the firing may be completed in 60 to 150 minutes. Since the coloring-firing temperature is higher, there is imposed limitation as to the sort of the usable inorganic coloring materials. At this temperature, the inorganic coloring material melts or 'sinks' into the glazing layer of the porcelain, resulting in improved stability of the coloring material layer. Meanwhile, this melting or sinking feature accounts for an alternative appellation 'sink-in coloring' for the in-gaze coloring. As typical of this in-glaze coloring material method, the JP Patent Kokai JP-A-58-25983 discloses an in-glaze decorating method exploiting a transcription sheet. The method disclosed features coating a coloring materialing layer on the glazing layer with a glass flux layer and firing the resulting mass.

Although the firing temperature in the above-described various coloring methods differ with the composition of the substrate of the ceramic articles used, it is approximately 1100° C., approximately 900° C. and approximately 750° C. for under-glaze coloring, in-glaze coloring and in on-glaze coloring, respectively, for the soft porcelain, such as bone china. On the other hand, with the hard china ware, such as hotel china, it may approximately be 1400° C., 1250° C. and 820° C., respectively. The firing temperature is similar for the hard pottery, classified into semi-vitrified china.

SUMMARY OF THE DISCLOSURE

As aforementioned in the background, there is much to be desired in the related art.

The decoration of the ceramic ware by in-glaze coloring as described above has many prominent features in respect of color and durability, as mentioned above. However, the decorative pattern, formed by this in-glaze coloring material, is flattened in appearance and poor in stereoscopic feeling.

Among the methods for forming a stereoscopic relief pattern on the porcelain surface, there are a technique of working a wet green (raw) substrate or a dry green substrate with a carving knife and a technique of previously forming a recessed pattern in a plaster mold used for molding and pouring a slurry into the recess pattern to form a convex mold registering with the green substrate surface. However, this method suffers a problem that the plaster mold with a delicate recess pattern is difficult to produce and in particular that the recessed portion of the plaster mold is worn out severely such that a large number of articles cannot be prepared using one mold.

Moreover, the substrate (body) carrying the convexed portion is calcined at approximately 800° C., glazed and fired ultimately. The glazed portion of the convexed portion becomes thinner in thickness, while the glazing of the neighboring recessed portion tends to be thicker in thickness, such that the decorative pattern of the glazed porcelain becomes dull without outstanding boundary.

On the other hand, there has also been known a technique of so-called raising "Mori" (Japanese) consisting in raising a coloring material layer to a thicker thickness on a smooth glazing surface resulting from the glost firing. This technique has so far been known under the appellation of Itchin raising "Itchin-mori", white raising or color raising and utilized as manual special artifice. However, this manual artifice is in need of a highly advanced technique. So, recently, it is being attempted to apply the thick raising technique used for coloring materials in the screen printing to a transfer sheet. In this respect, the JP Patent Kokai JP-A-5-301496 publication discloses a method consisting in repeating the thick coloring a number of times of coloring material layers on a transfer base sheet, using a manual carving pattern (mask) sheet of 200 to 350 μm. Adhering the transcription sheet onto a tile body surface and on-glaze coloring at a temperature of 700° C. to 800° C. In the screen printing, customarily used for routine coloring, the thickness of the coloring material layer used in the direct coloring on the substrate or in indirect coloring employing a transcription sheet is usually 5 to 40 μm, however, in the thick raising, a printing thickness of 50 to 500 μm is tentatively achieved. The desired thickness is obtained by applying coloring material paste on the transcription base sheet for several to tens times of the printing operations between drying steps. This transcription sheet is immersed in water and slid on the surface of the glazed porcelain surface to set a coloring material layer which is baked and fixed on drying and firing. The coloring material layer thus fired is tens to one hundred μm thick. The thicker the coloring material layer, the more are various defects produced to lower the yield.

However, this sort of the thick raising technique is limited to the on-glaze coloring. Although the decorative ceramic product gives a coloring material layer of a thick-felt raising and exhibits stereoscopic feeling, however, the wear resistance or corrosion resistance of the coloring material layer at the lower firing temperature ascribable to the on-glaze coloring still leaves much to be desired.

If the coloring material layer raised thick on the glazing surface of the ceramic article is directly heated o a firing temperature for on-glaze coloring, the targeted characteristics cannot be obtained in a simple manner such that defects exemplified by interruptions of creasing of patterns on the decoative part (coloring material layer) on the surface of the as-fired decorative porcelain are produced to give only unsatisfactory products. It is noted that interruptions and/or shrinkages or creasing of patterns is produced so that depletion of the decorative colored portion permits the glazing layer to be seen from above (see FIGS. 4 to 6).

The JP Patent Kokai JP-A-57-123876 publication discloses a method for decorating the ceramic articles consisting in forming a relief pattern by the in-glaze coloring. Although the Publication shows the use of chemical etching for forming a relief, the method disclosed is not sufficient to prevent the defects such as pattern interruptions and/or shrinkages/creasing in the decorative or colored portion of the as-fired decorative ceramic article.

It is a primary object of the present invention to provide a decorative ceramic article having a superior stereoscopic feeling by applying the thick raising technique as applied to the conventional on-glaze decoration artifice to the in-glaze coloring method at a much higher firing temperature and a transcription sheet therefor.

It is a secondary object of the present invention to provide a decorative ceramic article appreciably improved as to wear- and corrosion-resistance.

In one aspect, the present invention provides an in-glaze decoration raised decorative ceramic article having a raised coloring material layer obtained on in-glaze decoration on a glazing layer formed on a surface of a ceramic substrate layer, using a raised coloring material including inorganic pigment(s) and glass flux, in which the in-glaze coloring raised decorative ceramic article includes: a glass layer(or layers) of glass with a glass transition temperature of 450° C. to 550° C. between the glazing layer and the raised coloring material layer. The glass flux in the raised coloring material has a glass transition temperature ranging between 550° C. and 700° C.

In the above in-glaze decoration raised decorative ceramic article, the glass transition temperature in the glass flux in the raised coloring material is preferably 570° C. to 680° C. and more preferably 600° C. to 660° C.

In the above in-glaze decoration raised decorative ceramic article, the glass transition temperature in the glass in the glass layer is preferably 470° C. to 530° C. and more preferably 490° C. to 520° C.

In the in-glaze decoration raised decorative ceramic article, in a second aspect of the present invention, the raised coloring material layer has a thickness in the as-fired state (after firing) ranging between 20 and 250 μm.

In the in-glaze decoration raised decorative ceramic article, the thickness of the raised coloring material layer in the as-fired state is preferably 50 to 200 μm and more preferably 80 to 150 μm.

In the in-glaze decoration raised decorative ceramic article, the glass flux in the raised coloring material is preferably free from lead.

In the in-glaze decoration raised decorative ceramic article, in a third aspect of the present invention, the glass layer has a thickness in the as-fired state ranging between 0.1 and 50 μm.

In the in-glaze decoration raised decorative ceramic article, the glass layer has a thickness in the as-fired state ranging between 1 and 40 μm, preferably 3 to 30 μm, and more preferably 5 to 20 μm.

In the in-glaze decoration raised decorative ceramic article, in a fourth aspect of the present invention, the final firing temperature of the ceramic article substrate is not lower than 1100° C.

In the in-glaze decoration raised decorative ceramic article, in a fifth aspect of the present invention, the glass transition temperature of the glass flux in the raised coloring material is higher by 20° C. to 150° C. than the glass transition temperature of the glass layer.

In the in-glaze decoration raised decorative ceramic article, the glass transition temperature of the glass flux in the raised coloring material is higher by at most 100° C., and preferably by at most 75° C., than the glass transition temperature of the glass layer.

In a sixth aspect, the present invention provides a transcription sheet for in-glaze decorating a glazed surface of a ceramic article in which the transcription sheet includes at least a water-soluble adhesive layer formed on a base sheet(decal paper), a raised coloring material layer printed at a preset position/pattern on the adhesive layer, and glass frit, and a glass layer or layers formed between the adhesive layer and the raised coloring material layer. The raised coloring material layer contains an inorganic pigment(s). The glass layer has a glass transition temperature between 450° C. and 550° C., while the glass flux in the raised coloring material has a glass transition temperature between 550° C. and 700° C.

PREFERRED EMBODIMENTS OF THE INVENTION

Figure 1A:
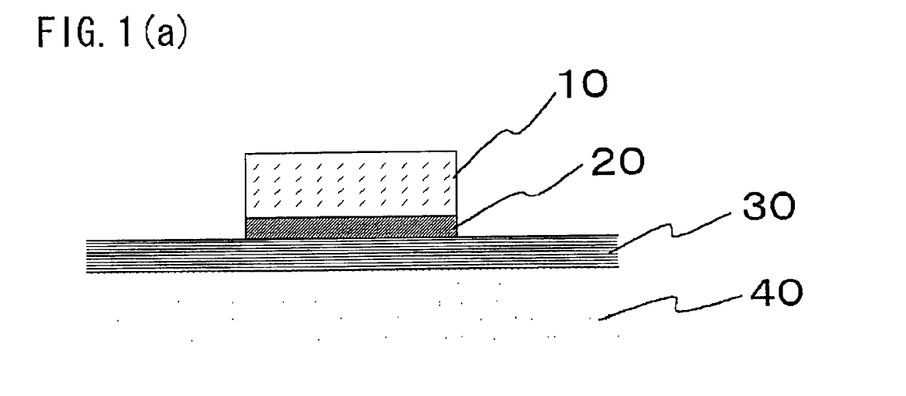
FIGS. 1A and 1B are partial cross-sectional views schematically showing an in-glaze decoration raised decorative ceramic article embodying the present invention, FIG. 1A showing the state prior to firing and FIG. 1B showing the state subsequent to firing.
Figure 1B:
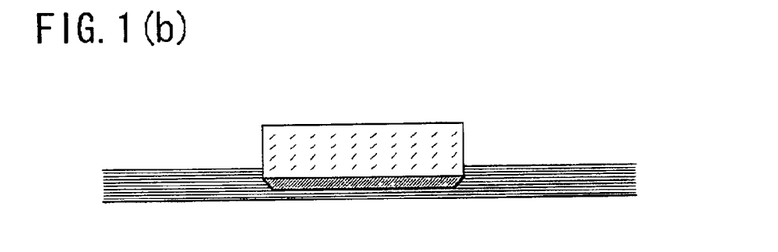

In the following, a preferred embodiment of the present invention will be explained in detail. FIG. 1 is a partial cross-sectional view schematically showing an in-glaze decoration raised decorative ceramic article, where FIGS. 1A and 1B show the states prior to and following firing, respectively. The raised decorative ceramic article by the in-glaze coloring material technique, also termed a high temperature up-glaze technique, is made up at least of a coloring material layer 10, a glass layer 20, a glazing layer 30, and a ceramic substrate layer 40.

The coloring material layer 10 first is explained. The coloring material layer 10 is a thick layer manifesting a stereoscopic feeling and a colorful feeling when viewed from outside. It is formed on the glass layer 20 and is made up usually of a colorless transparent glass flux and colored organic pigments having superior thermal resistance.

The glass flux used for the coloring material layer 10 is comprised of preset oxides and is of the composition determined to give a desired glass composition. Specifically, industrial products, such as oxides, carbonates, nitrates, or complex oxides of preset chemical components, reagents or kaolin, and natural raw materials (minerals), such as a variety of feldspar, are suitably selected and formulated as starting materials. These ingredients are mixed for several to tens of hours in a mixer, such as a dry or wet ball mill, operating substantially as a mixer, to give a sufficiently homogeneous mixture. In case the mixer is of the wet type, the mixture is transferred to a drier and dried sufficiently after which the resulting mixture is charged into a refractory crucible, formed e.g., of alumina, chamotte, refractory clay or platinum. For forming a homogeneous glass, a higher temperature is preferred, however, if the temperature is too high, the crucible may be eroded by the molten glass or the evaporation and dissipation of the constituent elements become outstanding such that the molten glass tends to be changed significantly in its chemical composition. So, the melting temperature of 1200° C. to 1400° C. generally is used. The homogeneously melted and vitrified mass is promptly charged into water and thereby quenched to form a homogeneous glass mass. This glass mass is pulverized by e.g., a ball mill to an average particle size of several microns to provide a binder for bonding inorganic pigments (glass flux). During this pulverizing process, similarly rough inorganic pigments may be added, in which case pulverization and mixing may be achieved simultaneously. Although there is no particular limitation to the chemical composition of the glass flux, which may be of a routine oxide composition of $SiO_2$, $Al_2O_3$, $B_2O_3$, $P_2O_5$, CaO, MgO, BaO, ZnO, PbO, $Na_2O$, $K_2O$, $Li_2O$ and other oxides as necessary. Preferably, the composition of the glass flux is a lead-free glass not containing lead components (PbO).

The inorganic pigments used for the coloring material layer 10 is a colorant component and may be those pigments used up to now in the field of ceramics. These inorganic pigments may be exemplified by turkish blue, lemon yellow, malon, selenium red, maruko, pink red, vanadium yellow, marine blue and ultramarine. In terms of compounds, the inorganic pigments may be exemplified by cobalt oxide, iron oxide, copper oxide, manganese oxide, chromium oxide, nickel oxide, tin oxide and complex oxides thereof.

The inorganic pigment mixed with the glass flux is termed "coloring material". As for the mixing process, the two may be separately pulverized and subsequently mixed together mechanically, or the inorganic pigment and the glass flux may be sufficiently pulverized and mixed subsequently. The mixture then is heated and maintained at 600° C. to 700° C. for one hour to several hours, fired and quenched and the resulting sintered mass is re-pulverized to a desired particle size. The coloring material from this processing is composed of the inorganic pigments and the glass flux unified and agglutinated/solidified together so that it is possible to evade inconveniences such as separation of ingredients in the subsequent process. The composition of the inorganic pigments and the glass flux is 100 parts by weight of the glass flux relative to 0.5 to 100 parts, preferably 1 to 30 parts by weight and more preferably 2 to 15 parts by weight of the inorganic pigments. The composition may be suitably set depending on the intensity of the coloration of the inorganic pigment used.

Figure 2:
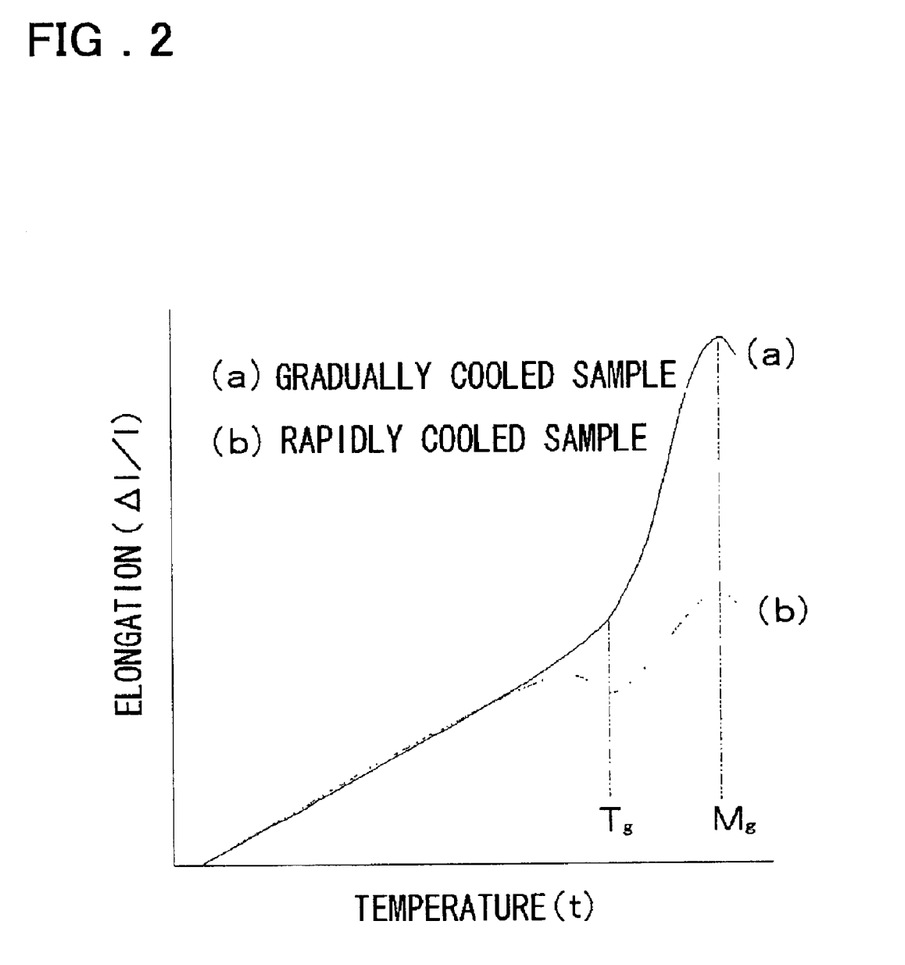
FIG. 2 is a graph showing a method for measuring the glass transition temperature and the glass softening temperature.

The glass flux used in the coloring material layer 10 features the glass transition temperature among the physical properties as defined in the glass flux being in a range of 550 to 700° C. The glass transition temperature may be found from a graph showing the relation between the temperature (t) and the elongation ($\Delta l/l$) of a gradually cooled glass specimen as found as the gradually cooled glass specimen sufficiently freed of distortion is heated at a constant rate. This graph is shown in FIG. 2 pertinent to the method for measuring the glass transition temperature and the method for measuring the glass softening temperature. In FIG. 2, the elongation curve is approximately linear in general for a temperature range from ambient to a certain temperature and, for a temperature higher than this temperature, the rate of increase of the elongation is several times as steep as that of the elongation up to the preset temperature. This critical temperature is termed a transition point Tg). When heated to a temperature higher than the transition point, the glass loses its elasticity to exhibit clear viscous fluidity and begins to be softened and contracted under its own gravity and a load applied thereto. This temperature is termed a softening point or a yield point (Mg) (Ceramic Engineering handbook, edited by Ceramic Association of Japan, published by GIHOUDO SHUPPAN KK, p.924, Jun. 1982, second edition).

Strictly speaking, the glass transition temperature may be accurately found in the form containing the inorganic pigments, that is as a coloring material. However, if the content of the inorganic pigments is 20 parts by weight or less, the transition point of the coloring material may safely be deemed to be that of the glass flux itself in terms of the practical application. So, in the present specification, the transition point of the glass flux itself is used, unless otherwise specified. If the softening temperature Mg of the glass flux is at a temperature below 550° C., it is too low as compared to the in-glaze coloring temperature, and no raised stereoscopic coloring material layer can be formed at this temperature on the glazing layer applied to the ceramic substrate (body), so that there is a risk of the coloring pattern shape being lost due to flowing. On the other hand, with the glass flux having a glass transition temperature exceeding 700° C., it is necessary to raise the aforementioned in-glaze coloring temperature. Thus, if this temperature is exceeded, the glazing layer on the substrate is re-melted or reacted with the glass flux to change various physical properties, such as the glass transition temperature. So, the glass transition temperature of the glass flux is preferably 580° C. to 680° C. and more preferably 600° C. to 670° C. The glass transition temperature of approximately 600° C. is desirable. The in-glaze coloring temperature is in a range from approximately 1100° C. to 1250° C. In this range of the in-glaze coloring temperature, the coloring material layer can 'sink' in the glazing layer, such that the decorative ceramic produced is superior in the wear- and corrosion-resistance.

The thick raising of the coloring material layer 10 can be realized with the conventional manufacture type artifice such as "Itchin-mori" or color raising. It is however desirable to use the screen printing, in particular the so-called transcription sheet method, according to which, as different printing master (mask)sheets, each having a preset pattern, are placed on a base sheet, screen printing is repeated to produce a multi-colored pattern having a dry thickness not less than 250 $\mu$m. In the case of a ceramic ware having a substantially flat portion, such as a flat saucer or tile, screen printing may be applied directly thereon, without using a transcription sheet, to realize a pattern of a desired thickness. Although the thickness of the as-fired raising decreases to approximately one half or to two thirds of the printing dry thickness, the thickness not less than 50 $\mu$m is desirable. With the thickness less than 50 $\mu$m, it is difficult to produce a pattern with the targeted stereoscopic feeling. Usually, the thickness of 50 to 250 $\mu$m is desirable, although a thickness exceeding this range may be used. The thermal expansion coefficient of the glass flux is correlated with that of the glazing layer, with the difference therebetween being preferably approximately $3.0 \times 0^{-6} K^{-1}$ or less, more preferably $2.0 \times 10^{-6} K^{-1}$ or less and most preferably $1.0 \times 10^{-6} K^{-1}$ or less. The larger the raising thickness, the smaller should be the value of this difference. With the larger difference value, distortion may be produced to cause defects such as cracks or peelings.

The glass layer 20 is now explained. This glass layer 20 is of a thinner thickness than the coloring material layer and is present between the coloring material payer 10 and the glazing layer 30 in intimate contact therewith.

The glass transition temperature of the glass layer 20 is in a range from 450° C. to 550° C. The glass with the glass transition temperature lower than 450° C. is generally inferior in durability and hence is not suited to a tableware material. If the glass transition temperature exceeds 550° C., the targeted effect is again not achieved because the viscosity is still high at the aforementioned decorating temperature such that fluidity falls short. The glass transition temperature of this glass layer is desirably 470° C. to 530° C.

The glass layer 20 is desirably as thin as possible without limitations. It is desirable that the glass layer 20 performs the role of rolls or a buffer layer when the thick coloring material layer lying thereabove in the intimate contact therewith. From the method of forming the glass layer, the lower limit value of the as-fired glass layer 20 is normally 0.1 to 5 $\mu$m, with the upper limit value being 30 $\mu$m. There is no meaning in setting the thickness to a higher value. The thickness is preferably 2 to 15 $\mu$m.

The glass for the glass layer 20 may be usual ones, preferably a lead-free glass likewise the glass flux. There is no Imitation on the glass composition of the glass layer, however, a commonplace glass having a low softening point (with low transition point) is preferred. The thermal expansion coefficient of the glass is preferably within a range approximately of 4 to $9 \times 10^{-6} K^{-1}$, taking into account of the stress (distortion) problem with the glaze layer and further with the coloring layer during cooling, and it is more preferred that the difference between each layer is in a range of 1 to $2 \times 10^{-6} K^{-1}$, however, the thinner the layer thickness of the glass layer, the more the influence of the thermal expansion coefficient can be negligible.

The ceramic substrate layer 40 is now explained. Although there is no limitation to the ceramic article serving as the ceramic article substrate layer 40 desirable for the present invention, the meritorious effect is manifest in application to hard porcelain, e.g., chinaware or white ceramic ware praised in hotels or in restaurants. This sort of porcelain is usually composed of 40 to 60 parts by weight of kaolin, 25 to 40 parts by weight of quartz, and 20 to 30 parts by weight of feldspar. Turning to a manufacturing method, a wet green molded article of a starting material is dried and biscuit-fired at 600° C. to 900° C. The resultant mass then is glazed and finally fired at 1200° C. to 1400° C. The chemical composition of the substrate is roughly 60 to 70 wt. % of $SiO_2$, 20 to 35 wt. % of $Al_2O_3$, 0.1 to 2 wt. % of CaO, 0.1 to 1 wt. % of MgO, 2 to 5 wt. % of $K_2O$, 0.5 to 3 wt. % of $Na_2O$, with the balance being $Fe_2O_3$ and $TiO_2$ etc.

The glazing layer 30 is now explained. As the glaze, used for the glazing layer 30, such a glazing is used which is suited to the aforementioned ceramic (porcelain) substrate. Depending on the final firing temperature, such a formulation represented by RO (basic components),0.3 to 1.2 $Al_2O_3$ and 3 to 9 $SiO_2$ (Seger formula) is selected for e.g., SK5 to 14. The thermal expansion coefficient of the glazing layer is 3 to $6 \times 10^{-5} K^{-1}$ on an average which is slightly lower than the thermal expansion coefficient of the substrate portion. Within the context of the present invention, the thermal expansion coefficient of the glazing layer is desirably higher than that of the glass of the glass layer or that of the glass flux, whilst the glass transition temperature thereof is desirably higher by at least 50° C. than that of the glass or the glass flux of the glass layer.

The decorative method for the porcelain is now explained. As the method for raised decoration, there are generally known a sketch which effects coloring directly or the porcelain surface with a coloring material brush, and raising. However, from the industrial point of view, a transcription sheet preferably is used, as described above.

In the field of normal ceramics, the transcription sheet is made up of (i) base sheet (decal paper), (ii) releasable layer (layer of water-soluble resin or starch) (iii) adhesive layer, (iv) coloring material layer and (v) overcoat layer. According to the present invention, there is inserted, in addition to this structure, a glass layer having the above glass transition temperature and a thickness of 0.1 to 30 $\mu$m (preferably 1 to 20 $\mu$m) between the adhesive layer (iii) and the coloring material layer (iv). The thickness of the coloring material layer is similarly not less than 50 $\mu$m, preferably not less than 100 $\mu$m and more preferably 200 $\mu$m or more. For realizing this thickness, a rougher mesh size of a printing screen is desirable in that the number of times of printing may be decreased. However, the pattern obtained is rougher such that it is not desirable if a fine texture of the ultimate product is desired. In such case, a large number of times of printing, such as ten or more times of printing, are desirable with the use of, for example, a 100 mesh screen.

In coloring glass or coloring material powders on a ceramic substrate or on a base sheet, these powders are prepared in the form of a paste (slurry) and added to with an organic resin to achieve as-dried shape retention characteristics. This resin, also termed "vehicle", is selected from among the acrylic resin, cellulose resin, butyral resin, vinyl resin, alkyd resin or a mixture or copolymers thereof. According to the present invention, the acrylic resin is preferred, while resin decomposition properties are also taken into consideration. For firing for the raised decoration, short-term prompt firing, such as RHK, is used in a majority of cases. Thus, if the burn-off characteristic of the resin is too fast, defects such as interruptions or shrinkages or creases tend to be produced in the coloring material layer. Thus, the resin is selected so that, if measurement is made by thermal differential analysis (TG-DTA) at the temperature elevating rate of 10° C./min in air, 5 to 10 wt. % of resin is left at a temperature of 400° C. or more, with the remaining amount being substantially zero at 550° C. or higher. If the remaining amount is less than 5 wt. % at a temperature of 400° C. or more, shrinkage or creasing is apt to be produced, whereas, if the remaining amount is less than 5 wt. % at a temperature of 400° C. or more, the remaining decomposed resin is left as carbon to cause black color, freckles or foaming observed after the firing.

The decorative ceramic articles according to the present invention, described above, are processed in the order of at least the glazing layer, thin glass layer and the raised coloring material layer, with the glass transition temperature of the glass layer being equal to or lower than that of the raised coloring material layer. The ceramic article, having a raised decorative layer, as printed and dried, is charged into a kiln where it is fired for decoration at a temperature on the order of 1100° C. to 1250° C. In a temperature range of 300° C. to 600° C., any harmful ingredients, such as resin, used as a binder in printing, are burned off. As the temperature is raised further, the glass making up the glass layer having the lowest glass transition temperature is softened and be comes fluidizable. Since the glass transition temperature of the glass flux making up the major portion of the coloring material layer is higher than the glass transition temperature of the glass layer, the glass flux powders first start to be sintered such that the raised coloring material layer in its entirety starts to be contracted. The glass layer on the bottom side, softened and fluidizable, is presumed to operate as a sort of a buffer layer, so that the contraction upon/during sintering becomes uniform in the entire coloring material layer. It may also be presumed that, with the technique of providing the coloring material directly on the glazing layer without using the glass layer, the glazing layer lying on the lower portion at the time of sintering is not softened nor fluidized, with the lower part thereof then being bound or anchored to render the sintering contraction non-uniform to produce interruptions or shrinkage/creasing of the decorative part.

The present invention will be explained with reference to several Examples. The decorative ceramic article according to the present embodiment is comprised of a ceramic substrate, a glazing substrate layer, a glass layer and a coloring material layer.

As the first ceramic substrate, used for decoration, a hotel chinaware substrate, which is a routine hard porcelain, is used. As the starting material for this substrate, 35 parts by weight of kaolin, 7 parts by weight of ball clay, 22 parts by weight of feldspar, 35 parts by weight of frint and 1.2 parts by weight of calcium carbonate were weighed out, mixed, wet ball-milled and subsequently molded. The resulting molded product was dried and biscuit-fired at a temperature of 700° C.

The glaze used for the first ceramic substrate is a raw glaze made up of 13 wt. % of kaolin, 42 wt. % of feldspar, 27 wt. % of quartz and 18 wt. % of lime. This glaze was coated on the first ceramic substrate and finally fired at 1300° C. The glazed and finally fired product was used as a ceramic substrate for raised decoration.

As the second ceramic substrate for raised decoration, a highly refractory porcelain, which is a substrate termed a hard china, was used. As a starting material for this substrate, 40 wt. % of pottery stone, 30 wt. % of kaolin, 15 wt. % of Gairome-clay(ball clay), 10 wt. % of feldspar and 5 wt. % of silica were weighed out and added to with water. The resulting product was wet ball-milled and mixed together to form a slurry, which was cast in a gypsum plaster mold to produce a plate-shaped molded product 100 by 100 mm in size and 5 mm in thickness. This molded product was dried and fired at 930° C. to produce a biscuit-fired substrate.

A raw glaze, separately prepared (40 wt. % of silica, 35 wt. % of feldspar, 15 wt. % of calcined kaolin, 5 wt. % of calcined talc and 5 wt. % of dolomite) was applied to the second ceramic substrate and suntering-fired at 1350° C. (SK No.12) for 40 hours. The thermal expansion coefficient of the sintering-fired product was $4.7 \times 10^{-6} K^{-1}$, with the glass transition temperature of this glazing layer being approximately 750° C. This glazed fired product was used as the ceramic substrate for raised decoration.

The raised decoration was carried out in the following order. A paste (slurry) composed of 0.6 parts by weight of a vehicle containing an acrylic resin and 1 parts by weight of transparent glass powders was printed by a hand screen printing machine for forming a glass layer on the glazed substrate to give a glass layer with a printing thickness of 30 $\mu$m on drying. The above paste was composed of 52 wt. % of $SiO_2$, 4 wt. % of $Al_2O_3$, 4 wt. % of $B_2O_3$, 3 wt. % of CaO, 14 wt. % of $Li_2O$, 7 wt. % of $Na_2O$ and 3 wt. % of BaO, with the balance being $SiO_2$ and so forth, with the average particle size being 5.0 $\mu$m, a glass transition temperature being 490° C. and with a thermal expansion coefficient being $8.67 \times 10^{-6} K^{-1}$. Then, using a 70-mesh screen, a paste of coloring material powders of the same vehicle and the same weight ratio was printed five times as the coloring material layer on said glass layer as a print layer to produce a dry thickness of 300 $\mu$m. The coloring material powders were composed of 97 parts by weight of the glass flux, and 3 parts by weight of the inorganic pigments of cobalt oxide, with the glass flux being made up of 63 wt. % of $SiO_2$, 9 wt. % of $Al_2O_3$, 3 wt. % of $B_2O_3$, 10 wt. % of CaO, 3 wt. % of $Li_2O$, 2 wt. % of $Na_2O$, 5 wt. % of $K_2O$ and 1 wt. % of BaO, and the balance being $SiO_2$ etc., with the average particle size being 5.5 $\mu$m, a glass transition temperature being 660° C., and a the thermal expansion coefficient being $6.7 \times 10^{-6} K^{-1}$. The raised decoration was fired for in-glaze coloring in a roller hearth kiln in an oxidizing atmosphere at a maximum temperature of 1240° C. with a cycle time being 150 minutes. The as-fired decorative surface had a raised thickness of approximately 200 $\mu$m.

Figure 3:
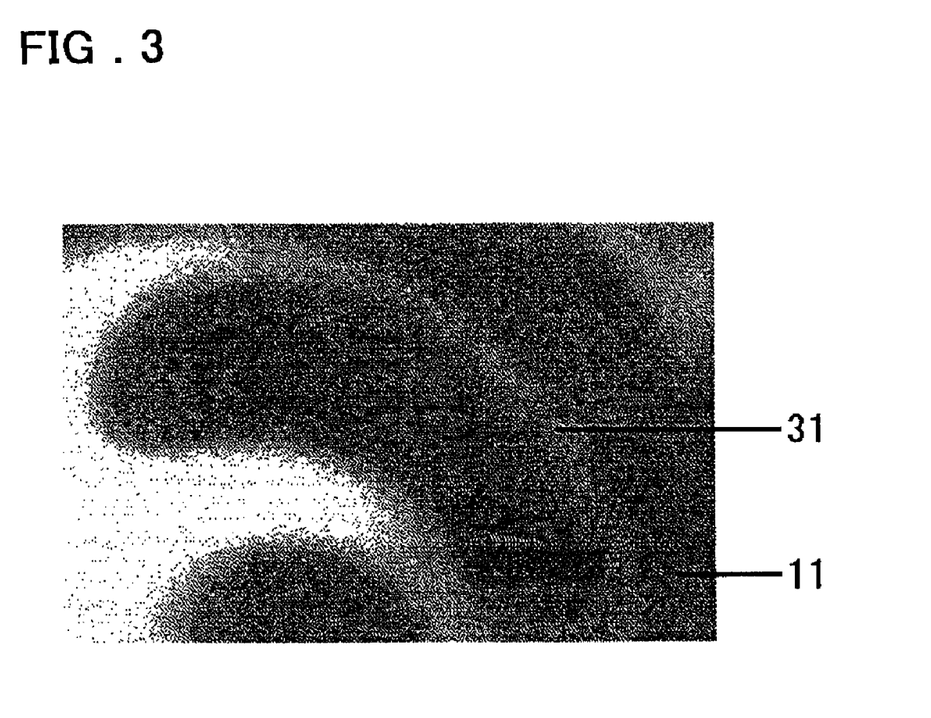
FIG. 3 is a partial enlarged photograph showing the state of the surface of the decorative part following the firing of the in-glaze decoration raised decorative ceramic article according to Example 1 of the present invention.

The raising coloring material following the in-glaze coloring, here the blue pattern proper to cobalt oxide, was uniformly colored, while there was no defect such as shrinkage/creasing which is white speckles of the glazing layer left over (see FIG. 3).

Example 2 is hereinafter explained. The glass flux for raised coloring is of a glass transition temperature of 700° C. with a dry printing thickness being 150$\mu$m. Other conditions were the same as those of Example 1. The raising thickness of the in-glaze decorative porcelain produced was 100 μm. In the coloring material layer, uniform coloring free of shrinkage/creasing was realized.

Example 3 is explained. A white raised coloring material, with an as-dried printing thickness of 200 μm (10 parts by weight of the inorganic pigments and 90 parts by weight of $ZrSiO_4$/glass flux, with a composition of the glass flux being 58 wt. % of $SiO_2$, 10 wt. % of $Al_2O_3$, 4 wt. % of $B_2O_3$, 8 wt. % of ZnO, 4 wt. % of (CaO+MgO), 5 wt. % of ($Li_2O+Na_2O+K_2O$), with an average particle size of 4.8 μm, a glass transition temperature of 550° C. and a thermal expansion coefficient of $5.7\times10^{-6}K^{-1}$), and a glass layer having a glass composition of 55 wt. % of SiO2, 8 wt. % of $Al_2O_3$, 24 wt. % of $B_2O_3$, 4 wt. % of $ZrO_2$, 8 wt. % of ($Li_2O+Na_2O+K_2O$), an average particle size of 4,5 μm, a glass transition temperature of 520° C. and a thermal expansion coefficient of $7.2\times10^{-6}K^{-1}$ were formed and fired at a temperature of 1220° C., with the other conditions being the same as those in Example 1. The raising thickness of 130 μm was obtained. The in-glaze decorative porcelain also was free of shrinkage/creases.

Example 4

As a porcelain substrate a formulation of 74 wt. % of kaolin, 23 wt. % of silica and 30 wt. % of feldspar was prepared and a slurry composed of $K_2O$: 0.18

$Na_2O$: 0.08

CaO: 0.27

MgO: 0.43

ZnO: 0.05

$Al_2O_3$: 0.73

$SiO_2$: 5.5 in terms of the Seger formula was applied to the concocted starting material. The resulting product was fired for sintering at 1290° C. (SK–10). The thermal expansion coefficient of the porcelain substrate at this time was $5.0\times10^{-6}K^{-1}$. The glaze had a thermal expansion coefficient of $4.7\times10^{-6}K^{-1}$ and a glass softening temperature of approximately 770° C. In terms of the chemical composition, the raised coloring material was a mixture of 4 parts by wt. of a glass flux and 6 parts by weight of cobalt oxide as a blue inorganic pigment. The glass flux is a composition of 66 wt. % of $SiO_2$, 10 wt. % of $Al_2O_3$, 3.3 wt. % of ZnO, 12 wt. % of CaO, 2.2 wt. % of MgO, 6.5 wt. % of ($Na_2O+K_2O$), with a glass transition temperature of 700° C. The raised coloring material was formed into a coloring paste with customary organic solvent and resin and screen printed several times on the glass layer to produce a coloring material layer with a dry thickness of 500 μm.

For forming a thin glass layer on the glazed porcelain substrate, a slurry of glass powders having the chemical composition of 51 wt. % of $SiO_2$, 6.5 wt. % of $Al_2O_3$, 16 wt. % of $B_2O_2$, 4.0 wt. % of ZnO, 6 wt. % of $ZrO_2$, 4.5 wt. % of (CaO+MgO) and 12 wt. % of ($Li_2O+Na_2O$), with a glass softening temperature of 470° C., was screen printed to produce a pattern of a glass layer with an as-dried thickness of 10 μm. Using the same pattern, a raised coloring material layer was formed for constituting a raised decoration.

The resulting product was fired in an oxidizing atmosphere of 1240° C. by RHK for 120 minutes to obtain a decorative porcelain having a raised height by the in-glaze coloring material of 250 μm. The decorative part was colored uniformly to a blue color, whilst no defects such as shrinkages/creases were observed on visual inspection with naked eyes or with a low multiplication factor.

The above-described Example is now contrasted with the Comparative Example.

Figure 4A:
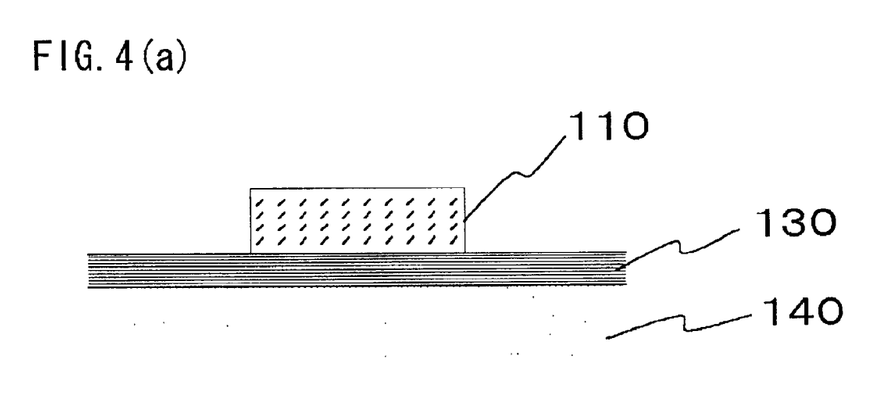
FIGS. 4A and 4B are partial cross-sectional views schematically showing an in-glaze decoration raised decorative ceramic article according to the Comparative Example 1, FIG. 4A showing the state prior to firing and FIG. 4B showing the state subsequent to firing.
Figure 4B:
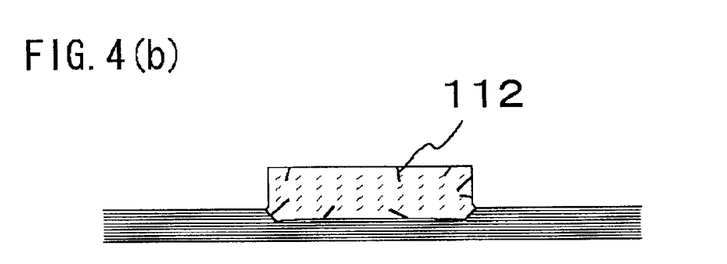
Figure 5:
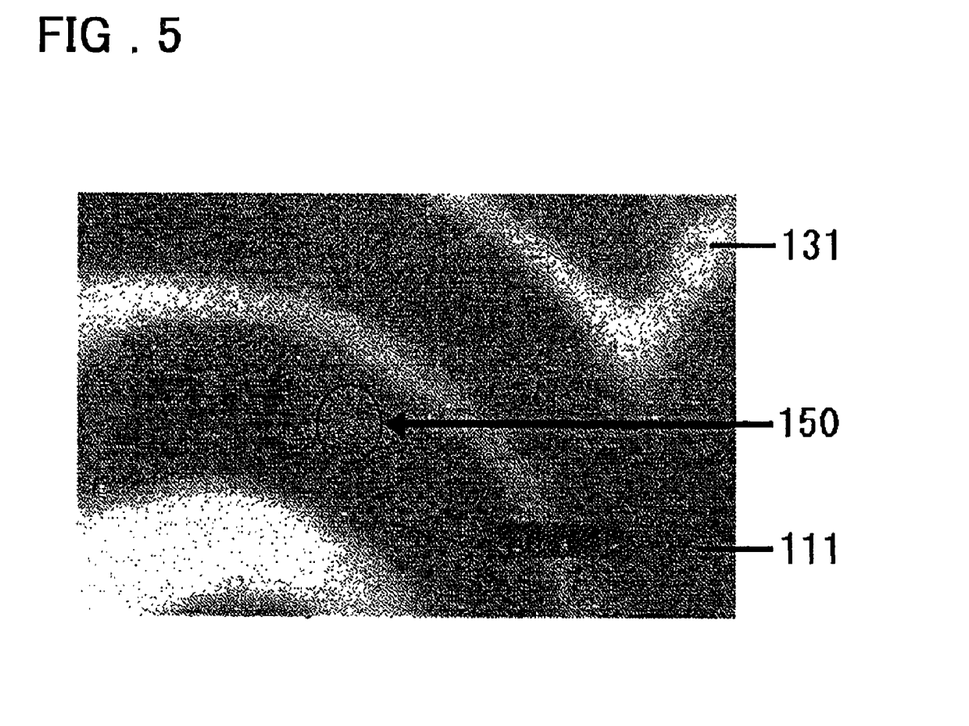
FIG. 5 is a partial enlarged photograph showing the state of the surface of the decorative part following the firing of the in-glaze decoration raised decorative ceramic article according to the Comparative Example 1.

The Comparative Example is now explained. In Comparative 1, raised decoration with the in-glaze coloring was carried out under the same condition as in Example 1 except not using the glass layer (see FIG. 4). A raised coloring material layer 110 was in-glazed into/on a glazing layer 130. During cooling, the lower portion of the raised coloring material layer 110 was secured/anchored to the glazing layer 130. Interruptions (cracks) 112 were formed inwardly extending from the surface of the raised coloring material layer 110 under the effect of the non-uniform contraction of the glazing layer 130. In FIG. 5, showing a partial enlarged photograph showing the state of the surface of the decorative part following the firing of the present Comparative Example, numerous white speckled points (shrinkages/ creases 150) presumed to be the color of the substrate (glazed portion 131) were observed in the blue decoration (raised coloring material portion 111) proper to cobalt oxide of the porcelain produced.

Comparative Example 2 is how explained. In Comparative Example 2, firing was carried out under the same condition as in Example 3 except not using the glass layer. On the raised coloring material decorative part, white speckled points, although few, were produced.

Comparative Example 3 is explained. In Comparative Example 3, firing was carried out under the same condition as in Example 1 except that a glass with a glass transition temperature of 560° C. was used as the glass layer and that a raised coloring material with a glass transition temperature of 540° C. was used as the raised coloring material layer. The decorative porcelain produced suffered from shrinkages/creases.

Figures 6A, 6B:
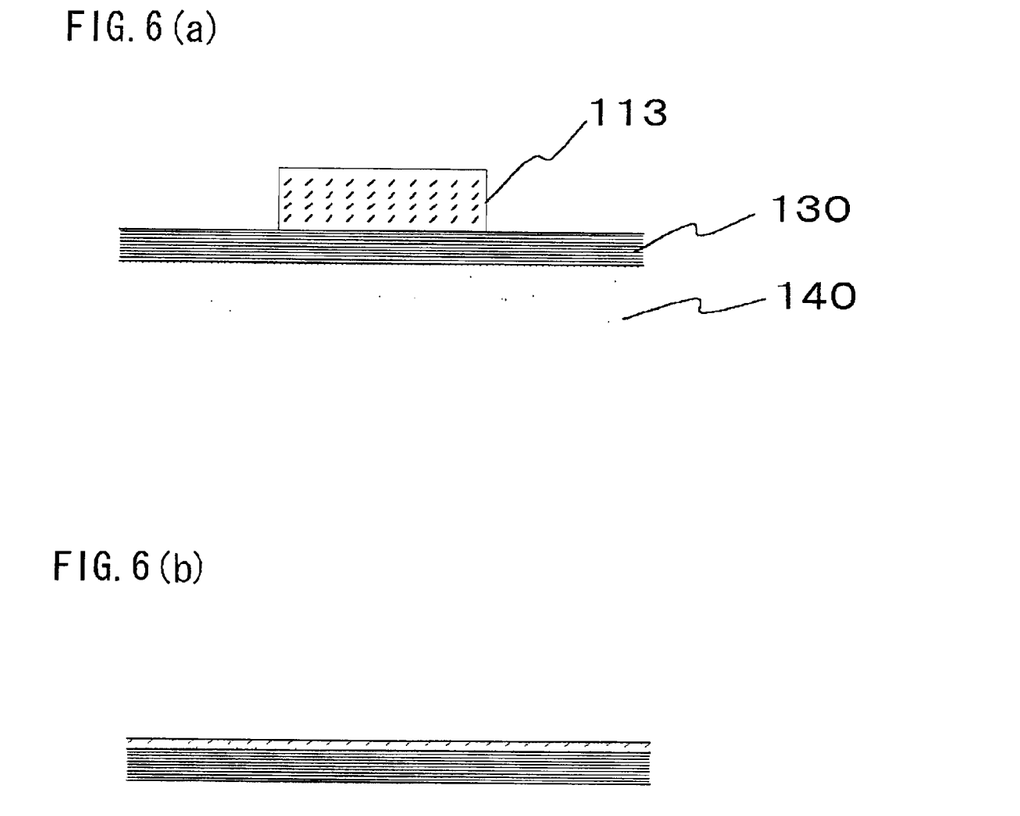
FIGS. 6A and 6B are partial cross-sectional views schematically showing an in-glaze decoration raised decorative ceramic article according to the Comparative Example 4, FIG. 6A showing the state prior to firing and FIG. 6B showing the state subsequent to firing.

Comparative Example 4 is explained. In this Comparative Example 4, a raising of 200 μm in height was formed without using the glass layer under the same conditions as in formulation of the porcelain substrate and RHK firing of Example 4. In this case, the raised coloring material layer was fluidized and spread, with its thickness being decreased to as low as 100 μm or less. (FIGS. 6(a),(b))

The meritorious effects of the present invention are summarized as follows.

According to the present invention, in which the decoration is fired at an elevated temperature not lower than 1100° C., the inorganic pigment partially sinks into the glazing layer (in-glaze coloring method) and moreover is bonded strongly to the glass flux, so that various properties such as wear resistance or corrosion resistance can be improved as compared to the on-glazing (over-glazing) method in which firing is performed at 800° C. to 900° C.

Moreover, a strong pattern with improved stereoscopic feeling and a higher raising can be produced.

It should be noted that other objects, features and aspects of the present invention will become apparent in the entire disclosure and that modifications may be done without departing the gist and scope of the present invention as disclosed herein and claimed as appended herewith.

Also it should be noted that any combination of the disclosed and/or claimed elements, matters and/or items may fall under the modifications aforementioned.

What is claimed is:

1. An in-glaze decoration raised decorative ceramic article having raised coloring material layer obtained on in-glaze decoration on a glazing layer formed on a surface of a ceramic substrate, using a raised coloring material including inorganic pigment(s) and glass flux, said in-glaze coloring raised decorative ceramic article comprising:

an intermediate glass layer with a glass transition temperature of 450° C. to 550° C. between said glazing layer and the raised coloring material layer;

said glass flux in said raised coloring material having a glass transition temperature ranging between 5500° C. and 700° C.

2. The in-glaze decoration raised decorative ceramic article as defined in claim 1 wherein said raised coloring material layer has a thickness in the as-fired state ranging between 20 and 250 μm.

3. The in-glaze decoration raised decorative ceramic article as defined in claim 1 wherein
said glass layer has a thickness in the as-fired state ranging between 0.1 and 50 μm.

4. The in-glaze decoration raised decorative ceramic article as defined in claim 2 wherein
said glass layer has a thickness in the as-fired state ranging between 0.1 and 50 μm.

5. The in-glaze decoration raised decorative ceramic article as defined in claim 1 wherein
the glost firing temperature of the ceramic substrate is not lower than 1100° C.

6. The in-glaze decoration raised decorative ceramic article as defined in claim 4 wherein
the glost firing temperature of the ceramic substrate is not lower than 1100° C.

7. The in-glaze decoration raised decorative ceramic article as defined in claim 1 wherein
the glass transition temperature of said glass flux in said raised coloring material is higher by 20° C. to 150° C. than the glass transition temperature of said glass layer.

8. The in-glaze decoration raised decorative ceramic article as defined in claim 4 wherein
the glost firing temperature of the ceramic substrate is not lower than 1100° C.

9. The in-glaze decoration raised decorative ceramic article as defined in claim 5 wherein
the glost firing temperature of the ceramic substrate is not lower than 1100° C.

10. The in-glaze decoration raised decorative ceramic article as defined in claim 6 wherein
the glost firing temperature of the ceramic substrate is not lower than 1100° C.

11. The ceramic article as defined in claim 1, wherein said glass transition temperature of the glass flux in said raised coloring material is 570 to 680° C.

12. The ceramic article as defined in claim 1, wherein said glass transition temperature of the glass in said glass layer is 470 to 530° C.

13. The ceramic article as defined in claim 1, wherein said raised coloring material layer has a thickness of 50 to 200 μm, after the firing.

14. The ceramic article as defined in claim 1, wherein said glass flux in the raised coloring material is free of lead.

15. The ceramic article as defined in claim 1, wherein said intermediate glass layer has a thickness of 0.1 to 50 μm after firing.

16. The ceramic article as defined in claim 1, wherein said intermediate glass layer has a thickness of 1 to 40 μm, after firing.

17. The ceramic article as defined in claim 1, wherein said glass transition temperature of the glass flux in said raised coloring material is by at most 100° C. higher than that of the glass in said intermediate glass layer.

18. A transcription sheet for in-glaze coloring a glazed surface of a ceramic article comprising:
at least a water-soluble adhesive layer formed on a base sheet;
a raised coloring material layer printed at a preset position and pattern on said adhesive layer, said raised coloring material layer containing an inorganic pigment(s) and a glass frit(s); and
a glass layer or layers formed between said adhesive layer and said raised coloring material layer, said glass layer or layers having a glass transition temperature between 450° C. and 550° C.
said glass flux in said raised coloring material having a glass transition temperature between 550° C. and 700° C.

19. The transcription sheet as defined in claim 18, wherein said glass transition temperature of the glass flux in said raised coloring material is 570 to 680° C.

20. The transcription sheet as defined in claim 18, wherein said glass transition temperature of the glass in said glass layer is 470 to 530° C.

21. The transcription sheet as defined in claim 18, wherein said raised coloring material layer has a thickness of 50 to 200 μm, after firing.

22. The transcription sheet as defined in claim 18, wherein said glass flux in the raised coloring material is free of lead.

23. The transcription sheet as defined in claim 18, wherein said intermediate glass layer has a thickness of 0.1 to 50 μm after firing.

24. The transcription sheet as defined in claim 18 wherein said intermediate glass layer has a thickness of 1 to 40 μm after firing.

25. The transcription sheet as defined in claim 18, wherein said glass transition temperature of the glass flux in said raised coloring material is by at most higher than that of the glass in said intermediate glass layer.

26. The ceramic article as defined in claim 11, wherein said glass transition temperature of the glass flux in said raised coloring material is 600 to 660° C.

27. The ceramic article as defined in claim 12, wherein said glass transition temperature of the glass in said glass layer is 490 to 520° C.

28. The ceramic article as defined in claim 13, wherein said raised coloring material layer has a thickness of 80 to 150 μm after the firing.

29. The ceramic article as defined in claim 16, wherein said intermediate glass layer has a thickness of 3 to 30 μm after firing.

30. The ceramic article as defined in claim 16, wherein said intermediate glass layer has a thickness of 5 to 20 μm after firing.

31. The ceramic article as defined in claim 17, wherein said glass transition temperature of the glass flux in said raised coloring material is by at most 75° C. higher than that of the glass in said intermediate glass layer.

32. The transcription sheet as defined in claim 19, wherein said glass transition temperature of the glass flux in said raised coloring material is 600 to 660° C.

33. The transcription sheet as defined in claim 18, wherein said glass transition temperature of the glass in said glass layer is 490 to 520° C.

34. The transcription sheet as defined in claim 18, wherein said intermediate glass layer has a thickness of 3 to 30 μm after firing.

35. The transcription sheet as defined in claim 18, wherein said intermediate glass layer has a thickness of 5 to 20 μm after firing.

36. The transcription sheet as defined in claim 18, wherein said glass transition temperature of the glass flux in said raised coloring material is by at most 75° C. higher than that of the glass in said intermediate glass layer.

* * * * *